United States Patent [19]
Halle et al.

[11] Patent Number: 5,462,807
[45] Date of Patent: Oct. 31, 1995

[54] HEAT SEALABLE FILMS AND ARTICLES

[75] Inventors: Richard W. Halle, Houston; Donna S. Davis, Baytown; Charles R. Harris, Jr., Mont Belvieu, all of Tex.

[73] Assignee: Exxon Chemical Patents Inc., Wilmington, Del.

[21] Appl. No.: 110,179

[22] Filed: Aug. 20, 1993

[51] Int. Cl.$^6$ .................................................. B32B 27/00
[52] U.S. Cl. ........................ 428/500; 428/35.7; 428/200; 428/349; 428/411.1; 428/515; 428/516; 428/523; 428/913
[58] Field of Search ................... 428/35.7, 200, 428/212, 347, 349, 411.1, 500, 515, 516, 523, 913, 520; 525/919; 526/348

[56] References Cited

U.S. PATENT DOCUMENTS

| | | | |
|---|---|---|---|
| 4,429,079 | 1/1984 | Shibata et al. | 525/240 |
| 5,032,463 | 7/1991 | Smith | 428/520 |
| 5,169,728 | 12/1992 | Murphy et al. | 428/516 |
| 5,206,075 | 4/1993 | Hodgson, Jr. | 428/216 |
| 5,244,996 | 9/1993 | Kawasaki et al. | 526/347 |
| 5,298,326 | 3/1994 | Norpoth et al. | 428/349 |
| 5,336,746 | 8/1994 | Tsutsui et al. | 526/348.6 |
| 5,358,792 | 10/1994 | Mehta et al. | 428/516 |

FOREIGN PATENT DOCUMENTS

| | | |
|---|---|---|
| 0580377A1 | 1/1994 | European Pat. Off. . |
| 87/03610 | 6/1987 | WIPO . |
| WO90/93414 | 4/1990 | WIPO . |
| 92/14784 | 9/1992 | WIPO . |
| 93/03093 | 2/1993 | WIPO . |
| WO93/03093 | 2/1993 | WIPO . |
| 93/11940 | 6/1993 | WIPO . |
| 94/07954 | 4/1994 | WIPO . |

*Primary Examiner*—Patrick J. Ryan
*Assistant Examiner*—Marie R. Macholl
*Attorney, Agent, or Firm*—Jaimes Sher

[57] ABSTRACT

The invention concerns a certain class of polymers, their production into films and applications for their use. These polymers have unique properties which make them particularly well suited for use in polymeric films. These films are very useful in applications requiring heat sealability, particularly those applications containing an ionomer film.

It has been discovered that polymers derived from metallocene catalyst systems surprisingly heat seal extremely well, as compared to polymer produced by conventional Ziegler-Natta catalysts, to a class of polymers known as ionomers.

13 Claims, 8 Drawing Sheets

Figure 7

Hot Tack Test Conditions: 3mil HDPE/tie/seal coex
Sample Width=15mm, Seal Time=0.5s, Peel@200mm/s
Sealing Pressure=72 psi, Delay=0.4s.

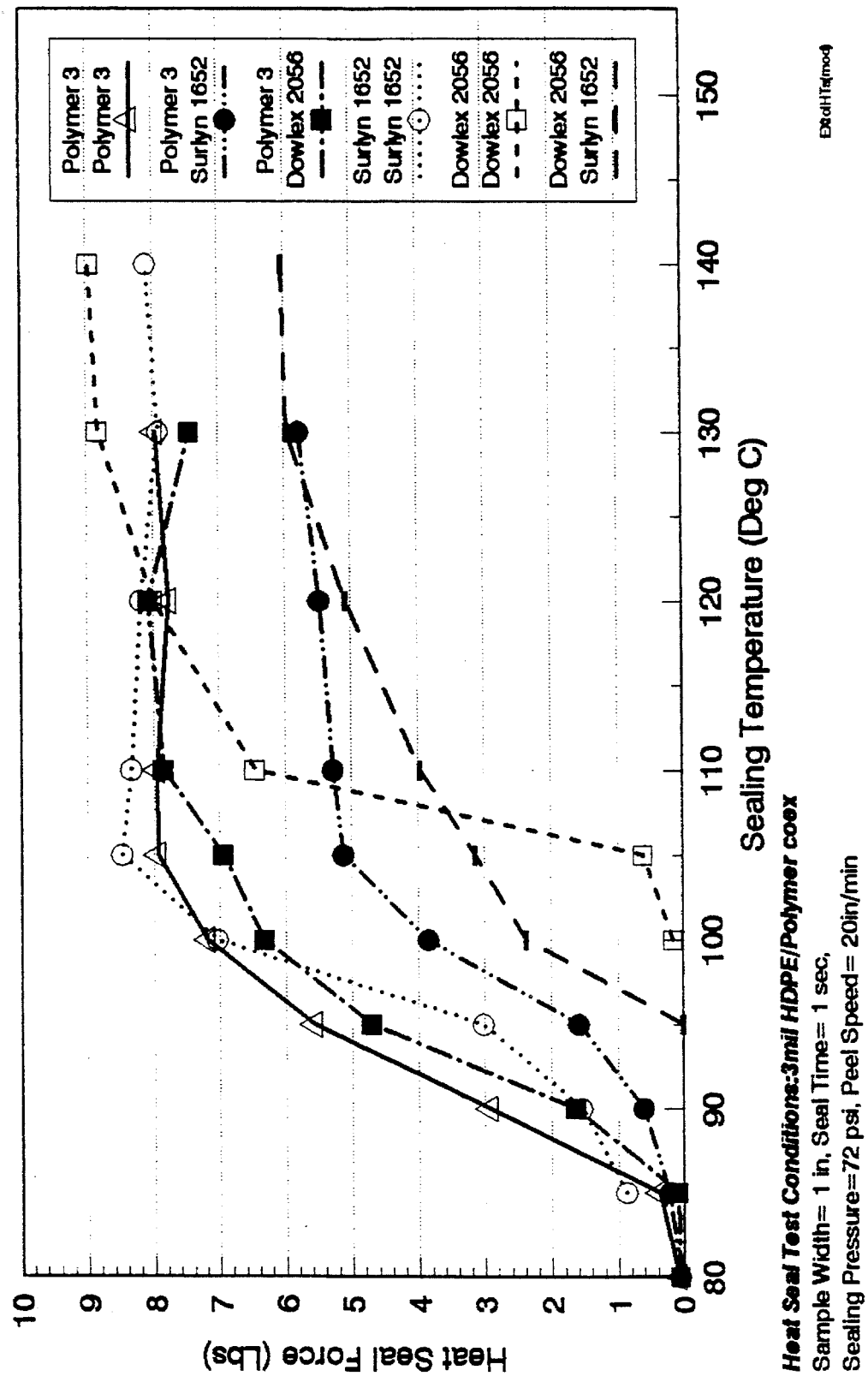

HEAT SEALABLE FILMS AND ARTICLES

FIELD OF THE INVENTION

This invention relates to heat sealable films and articles formed from these films. The films of the invention are heat sealable to a variety of materials and polymers including ionomers.

BACKGROUND OF THE INVENTION

Many articles of manufacture employing heat seals are currently available in the marketplace. Generally, the seals on such articles may be employed by welding two separate portions of the article together. For example, plastic parts usefully employed in machines and toys may be constructed by joining together two individual plastic pieces by heating one or both of the plastic pieces, pressing them together, and then, allowing them to cool. Specifically, heat sealing is very important in packaging applications. Packages formed by a heat seal provide for the efficient transportation of a consumer item within the package, provide a display of the consumer item that promotes sales, and, in the food industry, the packaging is employed to preserve the freshness of the consumer item. Most importantly and related to the actual heat sealing process, a manufacturer of such packages or any other like article requiring a seal requires excellent processability in terms of strong seals formed at low sealing temperatures.

Various types of polymers are used to form articles, which include packages, that may be joined together or sealed by the application of heat and/or pressure. Polymers or blends of polymers used to make the articles are selected for use because they provide a strong seal, which is easily and rapidly formed by a single short application of heat and/or pressure. Occasionally, the entire heat sealed article is constructed from the same polymer or a blend of polymers or by the coextrusion of the same or different polymers.

More often, the article is constructed of various areas or layers of different materials, and polymers which provide good heat sealing properties are utilized only in areas, or layers, where heat sealing will ultimately be necessary. This type of construction is employed because the articles, for instance multilayer films, should have desirable physical and mechanical properties such as clarity, strength, resistance to puncture and tearing, in addition to heat sealing properties, and should be easily processed by high speed equipment. Many plastic materials are known to possess good physical and mechanical properties but often do not also possess good heat sealing properties. For example, polypropylene has good strength and clarity and is resistant to tearing, but does not readily form good seals at the temperatures which are preferred in commercial sealing machinery. Conversely, some polymers with good heat sealing properties do not have adequate strength or clarity.

The packaging art has therefore developed multiple layer articles such as multilayer films incorporating one or more layers of the same or different types of polymers blended or coextruded together that provide good mechanical and physical properties and providing one or more additional layers formed from polymers that provide the article of manufacture with good heat sealing properties. In this way, for example, a film may be produced having a substrate layer of polypropylene provided for strength and clarity, and a layer of polyethylene to provide good heat sealing properties. Other articles, in addition to films, may be similarly constructed with a plurality of materials, each material selected to contribute to one or more of the desired properties of the final article.

Ionomers are tough, durable, transparent thermoplastics that are widely used in the form of films, molded components, extruded products and foams for packaging and a wide range of consumer and industrial products. In the area of packaging, particularly food packaging films constitute the largest single market for ionomers. Ionomers have excellent heat sealing characteristics, exhibiting high hot tack and heat seal strengths at low sealing temperatures. It is widely used as a heat-seal layer in a variety of flexible packaging composites produced by coextrusion, extrusion coating, lamination, and combinations of these techniques. Application examples including packaging for meat, cheese, snack foods and pharmaceuticals.

Polymers should be reasonably compatible to have good heat sealing performance when sealed to each other. Forming effective, strong seals generally requires a partial melting of the two films being sealed together and some intermixing of these melted films at the seal interface. This intermixing is important in hot tack strength where the seal strength is measured while the seal is still in a partially molten state. However, ionomers, due to their strong ionic/polar functionality, are not particularly compatible with conventional Ziegler-Natta produced linear polyethylenes. Therefore, a need exists in the industry for a film that effectively heat seals with ionomers.

SUMMARY OF THE INVENTION

This invention is generally directed toward polymeric films that are sealable to ionomer made films and to articles made from such combination.

In one embodiment, the invention is drawn to a polymeric film comprising at least two layers, a first of said layers comprising a polymer having a molecular weight distribution less than 3.0, and a $M_z/M_w$ less than about 2.0; and a second of said layers comprising an ionomer; wherein said first and second layers are pressed together to form a seal.

In another embodiment the invention relates to an article comprising a seal, said seal formed by pressing at least two portions of said article together at a temperature sufficient to soften at least one of the article portions, at least one of the portions being formed from at least one polymer having a $M_z/M_w$ of less than about 2.0 and a MWD less than 3.0 and another of said portions comprising at least one ionomer.

BRIEF DESCRIPTION OF THE DRAWINGS

The foregoing aspects, features and advantages of the invention will become clearer and more fully understood when the following detailed description is read in conjunction with the accompanying figures, in which:

FIG. 7 is a graph of hot tack force as a function of sealing temperature illustrating the data in Table 5 for Polymer 3.

FIG. 8 is a graph of heat seal force as a function of sealing temperature illustrating the data for Table 6 for Polymer 3.

DETAILED DESCRIPTION OF THE INVENTION

Introduction

Figure 1:
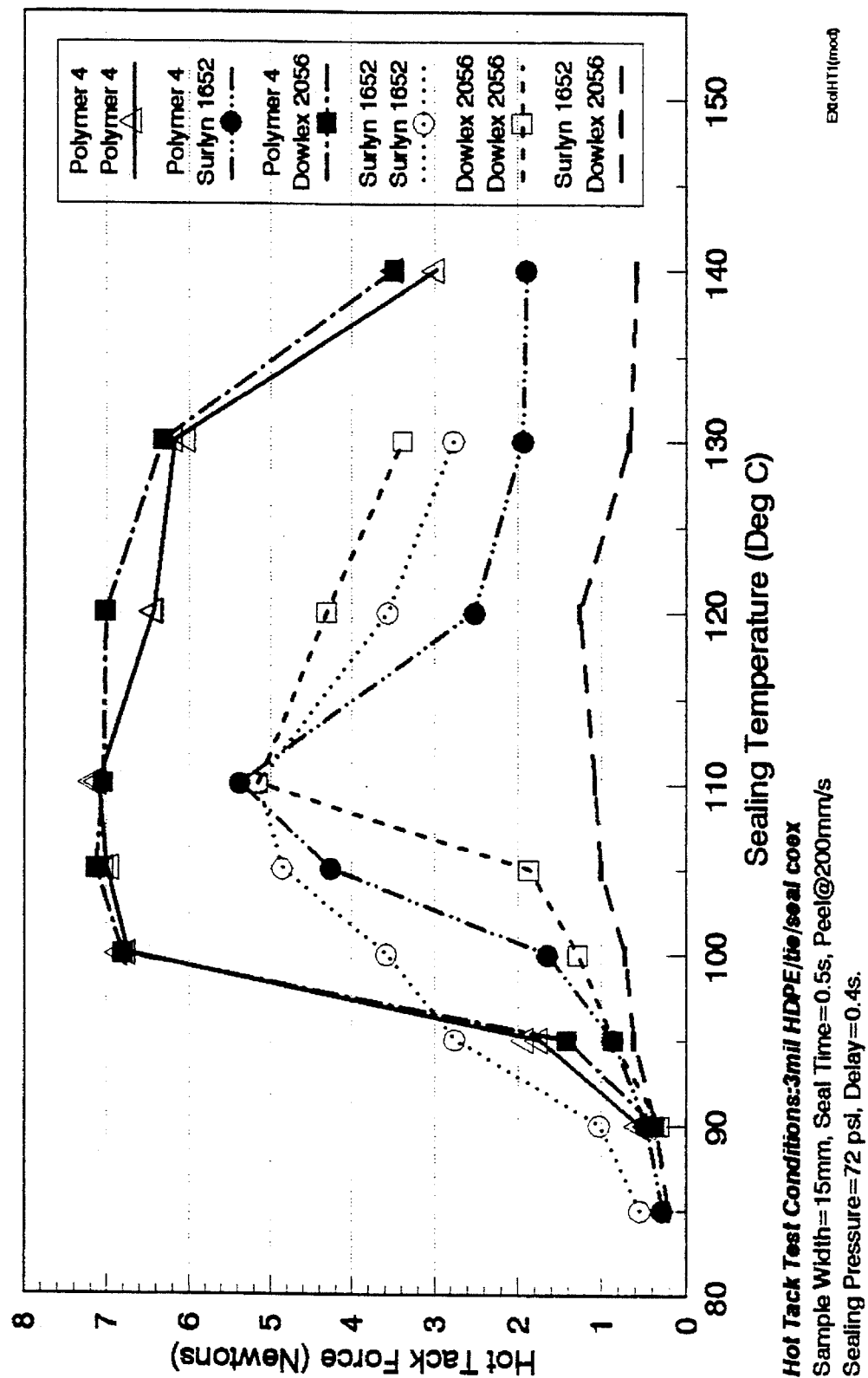
FIG. 1 is a graph of hot tack force as a function of sealing temperature illustrating data from Table 2.

The invention concerns a certain class of polymers, their production into films and applications for their use. These polymers have unique properties which make them particularly well suited for use in polymeric films. These films are very useful in applications requiring heat sealability, particularly those applications where the films are sealed to an ionomer film.

It has been discovered that polymers derived from metallocene catalyst systems surprisingly heat seal extremely well, as compared to polymer produced by conventional Ziegler-Natta catalysts, to a class of polymers known as ionomers.

Production of the Polymer

The polymer of this invention are produced using metallocene catalyst systems in a polymerization or copolymerization process in gas, slurry solution or high pressure phase.

The process for polymerizing or copolymerizing involves the polymerization of one or more of the alpha-olefin monomers having from 2 to 20 carbon atoms, preferably 2–15 carbon atoms. The invention is particularly well suited to the copolymerization reactions involving the polymerization of one or more of the monomers, for example alpha-olefin monomers of ethylene, propylene, butene-1, pentene-1, 4-methylpentene-1, hexene-1, octene-1, decene-1 and cyclic olefins such as styrene. Other monomers can include polar vinyl, dienes, norbornene, acetylene and aidehyde monomers. Preferably a copolymer of ethylene is produced such that the amount of ethylene and comonomer is adjusted to produce a desired polymer product. Preferably the comonomer is an alphaolefin having from 3 to 15 carbon atoms, more preferably 4 to 12 carbon atoms and most preferably 4 to 10 carbon atoms. In another embodiment ethylene is polymerized with at least two comonomers to form a terpolymer and the like. If a comonomer is used then the monomer is generally polymerized in a proportion of 70.0–99.99, preferably 70–90 and more preferably 80–95 or 90–95 mole percent of monomer with 0.01–30, preferably 3–30 and most preferably 5–20, 5–10 mole percent comonomer.

For the purposes of this patent specification the term "metallocene" is herein defined to contain one or more cyclopentadienyl moiety in combination with a transition metal of the Periodic Table of Elements. The metallocene catalyst component is represented by the general formula $(Cp)_m MR_n R'_p$ wherein $C_p$ is a substituted or unsubstituted cyclopentadienyl ring; M is a Group IV, V or VI transition metal; R and R' are independently selected halogen, hydrocarbyl group, or hydrocarboxyl groups having 1–20 carbon atoms; $m=1-3$, $n=0-3$, $p=0-3$, and the sum of $m+n+p$ equals the oxidation state of M. The metallocene can be substituted with principally hydrocarbyl substituent(s) but not to exclude a germanium, a phosphorous, a silicon or a nitrogen atom containing radical or unsubstituted, bridged or unbridged or any combination. Various forms of the catalyst system of the metallocene type may be used in the polymerization process of this invention. Exemplary of the development of these metallocene catalysts for the polymerization of ethylene is found in U.S. Pat. No. 4,871,705 to Hoel, U.S. Pat. No. 4,937,299 to Ewen, et al. and EP-A-0 129 368 published Jul. 26, 1989, and U.S. Pat. Nos. 5,017,714 and 5,120,867 to Welborn, Jr. all of which are fully incorporated herein by reference. These publications teach the structure of the metallocene catalysts and includes alumoxane as the cocatalyst. There are a variety of methods for preparing alumoxane one of which is described in U.S. Pat. 4,665,208.

Other cocatalysts may be used with metallocenes, such as trialkylaluminum compounds; or ionizing ionic activators or compounds such as, tri (n-butyl) ammonium tetra (pentaflurophenyl) boron, which ionize the neutral metallocene compound. Such ionizing compounds may contain an active proton, or some other cation associated with but not coordinated or only loosely coordinated to the remaining ion of the ionizing ionic compound. Such compounds are described in EP-A-0 520 732, EP-A-0 277 003 and EP-A-0 277 004 both published Aug. 3, 1988 and U.S. Pat. Nos. 5,153,151 and 5,198,401 and are all herein fully incorporated by reference.

Further, the metallocene catalyst component can be a monocyclopentadienyl heteroatom containing compound. This heteroatom is activated by either an alumoxane or an ionic activator to form an active polymerization catalyst system to produce polymers useful in this present invention. These types of catalyst systems are described in, for example, PCT International Publications WO 92/00333 published Jan. 9, 1992, U.S. Pat. Nos. 5,096,867 and 5,055,438, EP-A-0 420 436 and WO 91/04257 all of which are fully incorporated herein by reference.

In addition, the metallocene catalysts useful in this invention can include non-cyclopentadienyl catalyst components, or ancillary ligands such as boroles or carbollides in combination with a transition metal. Additionally it is not beyond the scope of this invention that the catalysts and catalyst systems may be those described in U.S. Pat. No. 5,064,802 and PCT publications WO 93/08221 and WO 93/08199 published Apr. 29, 1993 all of which are herein incorporated by reference. All the catalyst systems described above may be, optionally, prepolymerized or used in conjunction with an additive or scavenging component to enhance catalytic productivity.

The catalyst particles in a gas phase process may be supported on a suitable particulate material such as polymeric supports or inorganic oxide such as silica, alumina or both. Methods of supporting the catalyst of this invention are described in U.S. Pat. Nos. 4,808,561, 4,897,455, 4,937,301, 4,937,217, 4,912,075, 5,008,228, 5,086,025 and 5,147,949 and U.S. application Ser. Nos. 898,255, filed Jun. 15, 1992 and 885,170, filed May 18, 1992, all of which are herein incorporated by reference.

Characteristics of the Polymers of the Invention

A key characteristic of the polymer of the present invention is their composition distribution. As is well known to those skilled in the art, the composition distribution of a copolymer relates to the uniformity of distribution of comonomer among the molecules of the copolymer. Metallocene catalysts are known to incorporate comonomer very evenly among the polymer molecules they produce. Thus, copolymers produced from a catalyst system having a single metallocene component have a very narrow composition distribution—most of the polymer molecules will have roughly the same comonomer content, and within each molecule the comonomer will be randomly distributed. Ziegler-Natta catalysts, on the other hand generally yield copolymers having a considerably broader composition distribution. Comonomer inclusion will vary widely among the polymer molecules.

A measure of composition distribution is the "Composition Distribution Breadth Index" ("CDBI"). CDBI is defined as the weight percent of the copolymer molecules having a comonomer content within 50% (that is, 25% on each side) of the median total molar comonomer content. The CDBI of a copolymer is readily determined utilizing well known techniques for isolating individual fractions of a sample of the copolymer. One such technique is Temperature Rising Elution Fraction (TREF), as described in Wild, et al., *J. Poly. Sci., Poly. Phys. Ed.,* vol. 20, p. 441 (1982) and U.S. Pat. No. 5,008,204, which are incorporated herein by reference.

To determine CDBI, a solubility distribution curve is first generated for the copolymer. This may be accomplished using data acquired from the TREF technique described above. This solubility distribution curve is a plot of the weight fraction of the copolymer that is solubilized as a function of temperature. This is convened to a weight fraction versus composition distribution curve. For the purpose of simplifying the correlation of composition with elution temperature the weight fractions less than 15,000 are ignored. These low weight fractions generally represent a trivial portion of the resin of the present invention. The remainder of this description and the appended claims maintain this convention of ignoring weight fractions below 15,000 in the CDBI measurement.

From the weight fraction versus composition distribution curve the CDBI is determined by establishing what weight percent of the sample has a comonomer content within 25% each side of the median comonomer content. Further details of determining the CDBI of a copolymer are known to those skilled in the art. See, for example, PCT patent application WO 93/03093, published Feb. 18, 1993.

The polymers of the present invention have CDBI's generally in the range of 80–98%, usually in the range of 85–98% and most typically in the range of 90–95%. Obviously, higher or lower CDBI's may be obtained using other catalyst systems with changes in the operating conditions of the process employed.

The films of this invention are also distinguishable from known films made from Ziegler-Natta based resins on the basis of their molecular weight distribution (MWD). The MWD of the present polymers is materially narrower than that of polymers produced using traditional Ziegler-Natta catalysts. The polydispersity index ($M_w/M_n$) of our polymers is typically in the range of 1.5–3, compared to a range of 3 and above for most known Ziegler catalyzed polymers. In this regard the present resins are very different from many commercially available polymers produced using Ziegler-Natta catalysts. In addition, the tails of the molecular weight distribution curve for the present polymer are considerably smaller than those of known Ziegler-Natta LLDPE's. This distinction is readily apparent by comparing the ratio of $M_z/M_w$ (the ratio of the third moment to the second moment) and $M_{z+1}/M_w$ (ratio of the fourth moment to the second moment). Utilizing the present invention, polymers can be produced with an $M_z/M_w$ less than 2.5, usually less than 2.0 and most typically in the range of 1.4–1.9. In contrast, the ratio of $M_z/M_w$ for Ziegler-Natta polymers is typically above 2.5. Similarly, the value of $M_z+1/M_w$ for the present polymers is less than 4.0, usually less than 3.0 and most typically in the range of 2.0–3.0. For Ziegler-Natta polymers $M_z+1/M_w$ is generally much higher—typically above 4.0. Table I provides further data regarding $M_z$, $M_w$, $M_z+1$ for the polymers of this invention and also for some commercially available polymers.

Those skilled in the art will appreciate that there are several methods available for determining the molecular weight distribution of a polyethylene sample. For the purpose of Table I and other reference to $M_w$, $M_z$ and $M_z+11$ given in this application and the appended claims, molecular weight distribution is determined with a Waters Gel Permeation Chromatograph equipped with ultrastyro gel columns operated at 145° C. Trichlorobenzene is used as the eluting solvent. The calibration standards are sixteen polystyrenes of precisely known molecular weight, ranging from a molecular weight of 500 to a molecular weight of 5.2 million. NBS 1475 polystyrene was also used as a calibration standard.

The melt index of the resins of the invention are generally in the range of 0.1 to 1000 dg/min, preferably 0.1 to 100 dg/min, more preferably 0.1 to 20 dg/min and even more preferably 0.1 to 10 dg/min and most preferably 0.1 to 5 dg/min. In one embodiment the polymer of the invention has a MWD less than 3.0 and a CDBI greater than 70%.

Characteristics of the Ionomers

Ionomers is the generic term for polymers containing interchain ionic bonding. These ionic crosslinks occur randomly between the long chain polymer molecules to produce solid-state properties usually associated with high molecular weight.

However, heating ionomers to normal thermoplastic processing temperatures diminishes the ionic forces, allowing processing in conventional equipment. Generally, ionomers are based on metal salts of ethylene/methacrylic acid copolymers or acrylic acid copolymers, and have a long-chain, semicrystalline structure.

There are more than fifty commercial grades of ionomers with a wide range of properties. With the advent of new low-modulus resins, the flex modulus of commercial unreinforced ionomers ranges from 2000 psi (versus about 15,000 psi for the most flexible grade previously available) up to about 85,000 psi.

The properties vary according to type and amount of metal cation, molecular weight, composition of the base resin (i.e., relative content of ethylene and methacrylic acid groups), and added ingredients such as reinforcements or additives. The long-chain, semicrystalline polymer structure imparts characteristics normal to a polyolefin: good chemical inertness, thermal stability, low dielectrics, and low water vapor transmission. The carboxylic salt structure offers properties that differ from polyethylene.

For detailed information on preparing ionomers see U.S. Pat. Nos. 3,552,638, 3,597,887, 3,610,501, 4,351,931, 4,766,174, 4,690,981, 4,174,358, 4,663,383, 4,550,141, 4,539,263, 4,469,754, 4,387,188 and 4,235,980 all of which are incorporated herein by reference. In one embodiment of the invention ionomers are available under the tradename Surlyn® from E.I. Dupont Company, Wilmington, Del. Some representative Surlyn® ionomer grade resins include AD-8143, 8144, 8255, 8066, EC-8577, 8585, 7930, 7940, 1555, 1557, 1558, 1559, 1560, 1601, 1604, 1605, 1652, 1650, 1655, 1603, 1606, 1702, 1705, 1706, 1707, 1800 and 1855.

In another embodiment ionomers are also available under the tradename IOTEK™ from Exxon Chemical Company, Baytown, Tex. Some representative IOTEK™ ionomer grade resins include 3110, 4000, 4200, 7010, 7020, 7030, 8000, 8020 and 8030.

Properties of Films Produced from the Polymers

The polymers produced using the metallocene catalyst described above are in many applications markedly superior to commercially available products. These polymers are particularly useful in film applications. Table I sets forth the properties of films of this invention (polymers 1–5).

A particular attribute of the present polymers is their very low level of extractable components. The extractables level for most grades of polymers are in the range of between 5.5% to below 0.1%, preferably below 2.6%, more preferably below 1.0%, even more preferably below 0.8% and most preferably below 0.5%.

The extractables level of the described polymers generally increases with decreasing molecular weight and decreasing density. At any given molecular weight and density (or side chain branching) our resins have an extractables level significantly below that of the counterpart Ziegler-Natta grade. For the purposes of this specification and the appended claims, the extractables level is measured by exposing film produced from the polymer to n-hexane at 50° C. for 2 hours. This process is further detailed in 21 CFR 177.1520 (d)(3)(ii) an FDA requirement. It will be appreciated by those skilled in the art, that the extractables test is subject to substantial variation. The variations may be due to film thickness (4 mils maximum) or any other variable that changes the surface to volume ratio. Film fabrication type (e.g. blown, cast) and processing conditions may also change the extractable amount. The low extractables of films produced from these resins makes them well suited for food applications.

There are several important characteristics of a good heat sealing polymer. One important characteristic is the heat seal initiation temperature. This is the temperature to which the polymer must be heated before it will undergo useful bonding to itself or some other polymer under pressure. Therefore, heat sealing temperatures above the seal initiation temperature result in heat seals with considerable and measurable seal strength. Relatively lower heat seal initiation temperatures are desirable in commercial heat sealing equipment. The lower temperatures provide for higher production rates of the packages on the equipment because the polymer need not be heated to as great a temperature to make the seal. The critical factor controlling the production rates in heat sealing is the time required to transfer the heat to the interface and melt the polymer film. Lower seal initiation temperature provides shorter times to transfer the heat and therefore melt the polymer. Also, cooling of the seal to attain adequate strength will be faster.

Seal initiation temperature (SIT) is defined as the minimum temperature required to develop measurable strength of the heat seals. The limiting factor controlling the productivity (# packages/Unit Time) in commercial heat sealing operations is the time required to transfer the heat to the interface and achieve the desirable temperature for sealing. The lower the SIT, the shorter is the time required to transfer the heat to the interface for sealing the surfaces. Qualitatively, even 10° C. decrease in the SIT will result in 30% improvement in the productivity. For a detailed description see PCT Application No. WO 93\03093 published Feb. 18, 1993, which is incorporated herein by reference. This reference discusses the heat sealing characteristics of some of the polymers when made into films useful in the invention. However, this reference does not disclose sealing these films to an ionomer.

Another characteristic is the sealing window, which is the range of temperatures acceptable for forming a seal. The sealing window determines the acceptable range of operating temperatures where seal strength remains essentially constant. The low temperature in the range is the seal initiation temperature and the upper temperature in the range is the temperature where the seal strength decreases below the acceptable level or the polymer begins to degrade.

A further sealing characteristic is the measure of the cohesive strength during the cooling stage before solidification of a heat seal. Immediately after each seal is formed and before it cools down the sample is torn apart, and the seal strength is measured. This strength is known in the art as hot tack and is measured in force per unit of seal width. The higher the hot tack the better. It has also been discovered that the comonomer used in forming a ethylene interpolymer of the present invention affects the hot tack. As the number of linear carbon atoms of the comonomer is increased from for example butene-1 to hexene-1 to octene-1 the hot tack increases significantly. This dramatic affect is particularly seen between using the comonomer butene-1 versus hexene-1.

The interplay between these three important sealing characteristics, seal initiation temperature (SIT), seal strength (SS), sealing window and hot tack (HT) are extremely important to a user of film or the like. Particularly in the packaging area, where bags or the like are being processed and made very rapidly, these characteristics become very important. A low SIT allows a packager to use less heat and/or pressure to form a seal; a high seal strength provides for a stronger and quicker forming seal; high hot tack prevents the failure, opening, of a seal and loss of packaged product at the high packaging speeds. All of these in combination provide a packager with the ability to increase line speed of a given process. Not only will a packager benefit by an increased production rate but also the cost savings associated with operating a process with significantly lower temperatures.

The heat sealing temperature must be high enough to partially melt/soften the polymers so that they will stick to the material to which they are being sealed. The heat sealing temperature may range as high as the melting temperature of the interpolymers or even higher, but at temperatures this high the sealing contact time must be shortened.

FILMS OF THE INVENTION

The films of this invention can be formed from the polymer of the invention and ionomers by methods well known in the art. For example, forming operations include, film, sheet, and other fiber extrusion and co-extrusion as well as blow molding, injection molding and roto molding. Films include blown or cast films in monolayer or multilayer constructions formed by coextrusion or by lamination or by extrusion coating.

For example, the polymers of the invention may be extruded in a molten state through a flat die and then cooled to form sheets or cast films. Alternatively, the polymers may be extruded in a molten state through an annular die and then blown and cooled to form a tubular film. The tubular film may be axially slit and unfolded to form a flat film. The films of the invention may be unoriented, uniaxially oriented or biaxially oriented.

The films of the invention may be single layer or multilayer films. The multiple-layer films may consist of one or more layers formed from polymers of the invention and at least one layer of the film or one of the films is an ionomer. The films may also have one or more additional layers formed from other materials such as other polymers, LLDPE, LDPE, HDPE, PP, PB, EVA, polyester, EVOH and, for instance, metal foils, paper and the like.

Multiple-layer films may be formed by methods well known in the art. If all layers are polymers, the polymers may be coextruded through a coextrusion feedblock and die assembly to yield a film with two or more layers adhered together but differing in composition. Multiple-layer films may also be formed by extrusion coating whereby a substrate material is contacted with the hot molten polymer as the polymer exits the die. Extrusion coating is useful with substrates that are woven or knitted from natural or synthetic fibers or yarns, e.g., textiles, or substrates made from non-polymer materials such as glass, ceramic, paper or metal.

Multiple-layer films may also be formed by combining two or more single layer films prepared as described above. The two layers of a film so formed may be adhered together with an adhesive or by the application of heat and pressure.

The peak hot tack force of the seals of the invention are in the range of about 2 N to about 10 N, preferably, about 2 N to about 8 N, most preferably, about 2.5 N to about 7 N. In one embodiment the seals have a peak hot tack force of greater than about 2 N with a sealing temperature of about 80° C. to about 110° C. In another embodiment the seals have a peak hot tack force of about 2 N with a sealing temperature of about 80° C. to about 105° C. In a further embodiment the seals have a peak hot tack force of greater than about 2.5 N with a sealing temperature of about 85° C. to about 100° C.

In the preferred embodiment the films of the invention are formed by heat sealing at least one layer produced by a polymer of the invention to at least one layer of an ionomer. Tables 2–7 illustrate the results obtained from sealing various polymers of the invention to themselves, to an ionomer, namely Surlyn® 1652, and a traditional LLDPE, Dowlex 2056. Also illustrated in the tables is sealing data of the ionomer and Dowlex 2056 sealed to themselves and each other.

EXAMPLES

In order to provide a better understanding of the invention including representative advantages thereof, the following examples are offered.

All films tested in Tables 2–7 were substantially identical except for the seal layer polymers which were either the polymers of the invention, Dowlex 2056 or the ionomer. The films were coextrusions of A/B/C construction such that A is a HDPE, B is a tie layer and C the seal layer. The HDPE used is PAXON 4700 available from Allied Signal Inc. and the tie layer ESCOR ATX-310, acid terpolymer, available from Exxon Chemical Company, Baytown, Texas. The films were cast on 1-inch Killion Mini Cast Film Line, Model KLB 100 into films having a thickness of about 3 mils such that each of the three layers, A/B/C, were approximately 1 mil in thickness.

The films were then subjected to two tests, in which Tables 2–7 illustrate the results.
1) Hot tack force was run on a DTC Model 52D Hot Tack Tester with the following standards and settings:
   Sample Width=15 mm; Seal Depth=5 mm
   Seals were made across the film in the transverse direction (TD) and pulled in the machine direction (MD)
   Seal Pressure=72 psi (0.5 N/mm$^2$)
   Seal Time=0.5 sec
   Delay Time (time from seal bar opening to seal test)=0.4 sec
   Hot Tack Strength values are the average of eight highest loads measured during the test. Each value in the Tables is the average of 3–5 of these tests.
2) Heat Seal Strength were made from films on a Theller Model EB laboratory heat sealer. A dwell time of about one second and a sealing pressure of 72 psi (0.5 N/mm$^2$) was used for making the seals. The seals were made in the TD and pulled in the MD. The seal samples were 5 inches wide by 3/8 inch deep. The seals were pulled on a United 6 Station Tensile Tester at 20 inches/minute strain rate (peel speed) with a jaw setting of 2 inches. Samples were cut into 1 inch (2.54 cm) wide pieces for seal strength testing. The free ends of the sample were fixed in jaws, and then the jaws are separated at the strain rate until the seal failed. For the purposes of this patent specification the peak hot tack force is the highest hot tack strength acheived.
3) Heat Seal Peel/Tear values in the tables are a measure of seal failure during the heat seal test. Peel represents where the seal peels apart, i.e., the seal itself separates along the interface between the film layers. Tear represents where the film fails at one edge of the seal, i.e., but the seal remains intact. Peel-Tear represents where some samples peeled and some tore or some samples began to peel and then tore during the test. Each value in the Tables is the average of 2–5 samples.

Corresponding to each Table is a representative Figure.
FIG. 1 which corresponds to Table 2 and FIG. 2 corresponds to Table 3;
FIG. 3 corresponds to Table 5, Polymer 1 and FIG. 4 corresponds to Table 6, Polymer 1;
FIG. 5 corresponds to Table 5, Polymer 2 and FIG. 6 which corresponds to Table 6, Polymer 2;
FIG. 7 corresponds to Table 5, Polymer 3 and FIG. 8 which corresponds to Table 6, Polymer 3.

In FIGS. 3–8 the curves representing films of Surlyn/Surlyn, Surlyn/Dowlex and Dowlex/Dowlex derived from the data in Tables 1 and 2. The curves are presented in each figure for comparative purposes.

From Tables 2–7 and FIGS. 1–8 it is apparent that when heat sealed to an ionomer, Polymers 1–4 exhibit high hot tack and good heat seal strengths at low sealing temperatures. These results are substantially different and unexpected from that obtained when sealing a conventional LLDPE to an ionomer.

As shown in FIG. 1, and reproduced for comparative purposes in FIGS. 3, 5, and 7, ionomer (Surlyn 1652) sealed to itself (open circles) and conventional LLDPE (Dowlex 2056) sealed to itself (open squares) both have high hot tack, although, higher sealing temperatures are required in the LLDPE example. When the ionomer is sealed to the conventional LLDPE (dashes) an extremely low hot tack is measured. The peak hot tack of these two incompatible polymers is about 5 times less than the peak hot tack of either polymer sealed to itself.

FIG. 1 clearly demonstrates the superior hot tack of Polymer 4 when sealed to the ionomer (solid circles). In this case the hot tack of the Polymer 4-to-ionomer seal is essentially equivalent to that of the ionomer sealed to itself.

A similar set of hot tack comparisons is given in FIG. 3 for Polymer 1. Again, Polymer 1-to-ionomer seals (solid circles) have essentially the same peak hot tack as the ionomer seals but at lower temperatures.

Polymer 2's hot tack performance is shown in FIG. 5 (open triangles). The hot tack of Polymer 2 is about the same as the conventional LLDPE but Polymer 2-to-ionomer (solid circles) hot tack is almost three times greater than the hot tack of the conventional LLDPE-to-ionomer (dashes) seals.

FIG. 7 shows that the excellent hot tack of the Polymer 3-to-ionomer seals (solid circles).

Figure 2:
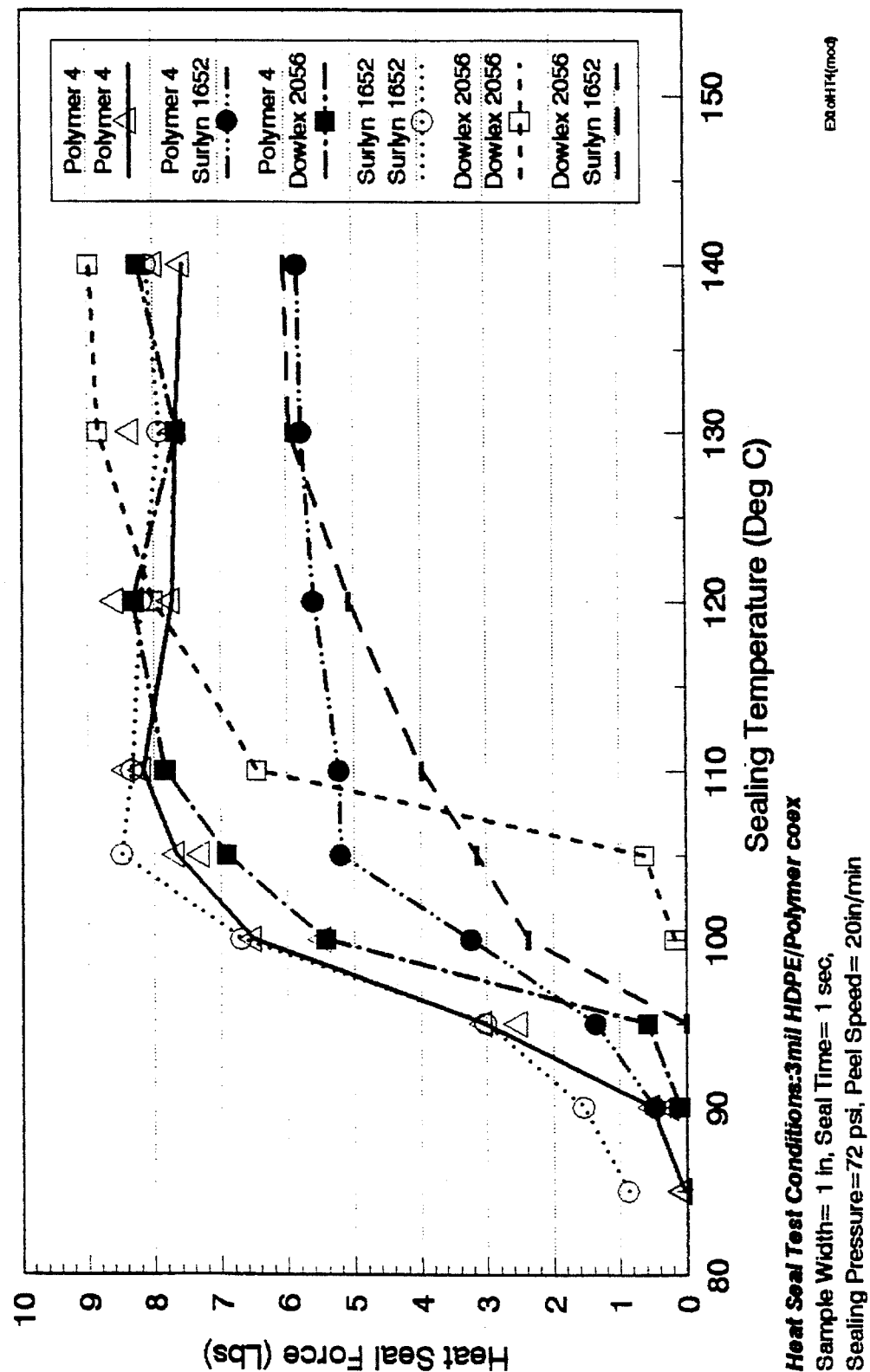
FIG. 2 is a graph of heat seal force as a function of sealing temperature illustrating the data from Table 3.
Figure 3:
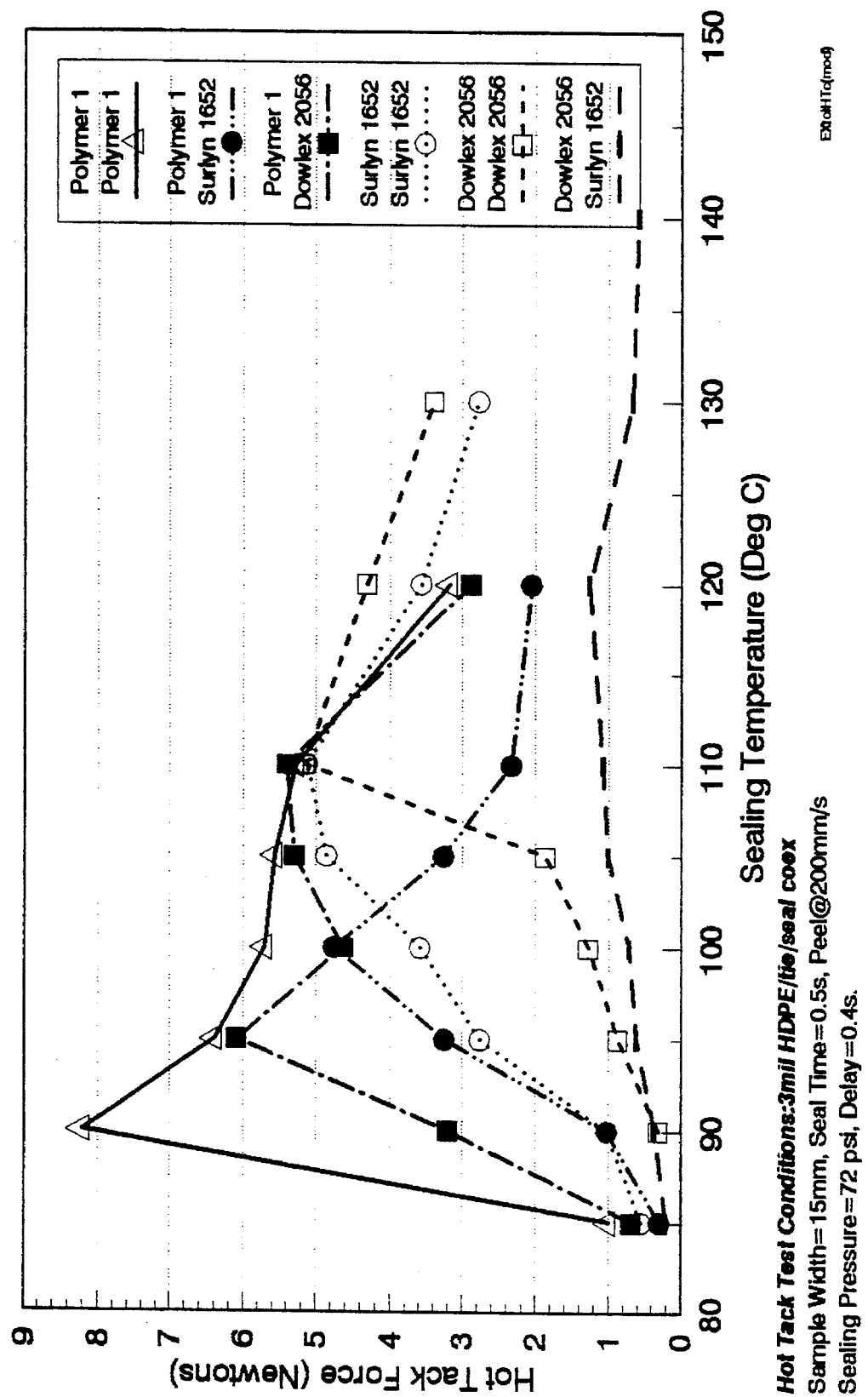
FIG. 3 is a graph of hot tack force as a function of sealing temperature illustrating the data in Table 5 for Polymer 1.

FIG. 2 presents the heat seal strength as a function of sealing temperature for the same set of polymer films as were used to generate the hot tack curves shown in FIG. 1. The plateau (maximum) seal strengths of all three polymers, (Polymer 4, ionomer, the conventional LLDPE) when sealed to themselves is equivalent. The conventional LLDPE exhibits a higher seal initiation temperature than the other polymers. When the conventional LLDPE is sealed to the ionomer the seal strength does not plateau until high sealing temperatures are reached; whereas, the Polymer 4-to-ionomer heat seals reach their maximum strengths at much lower sealing temperatures. The lower maximum seal strengths of the Polymer 4-to-ionomer and conventional LLDPE-to-ionomer seals are due to their peeling failure mode versus tearing mode, as is shown in Table 4.

Figure 4:
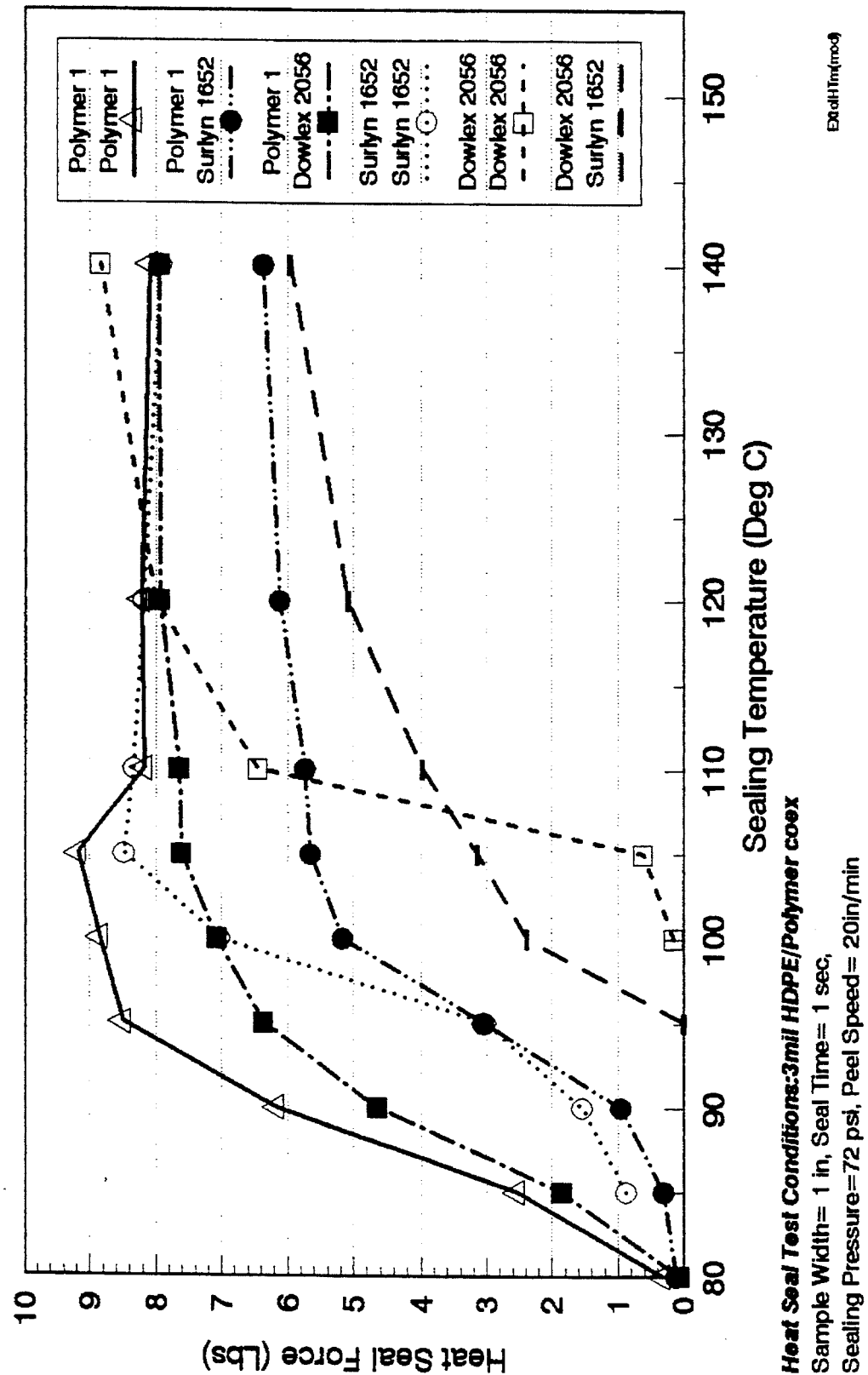
FIG. 4 is a graph of heat seal force as a function of sealing temperature illustrating the data from Table 6 for Polymer 1.
Figure 5:
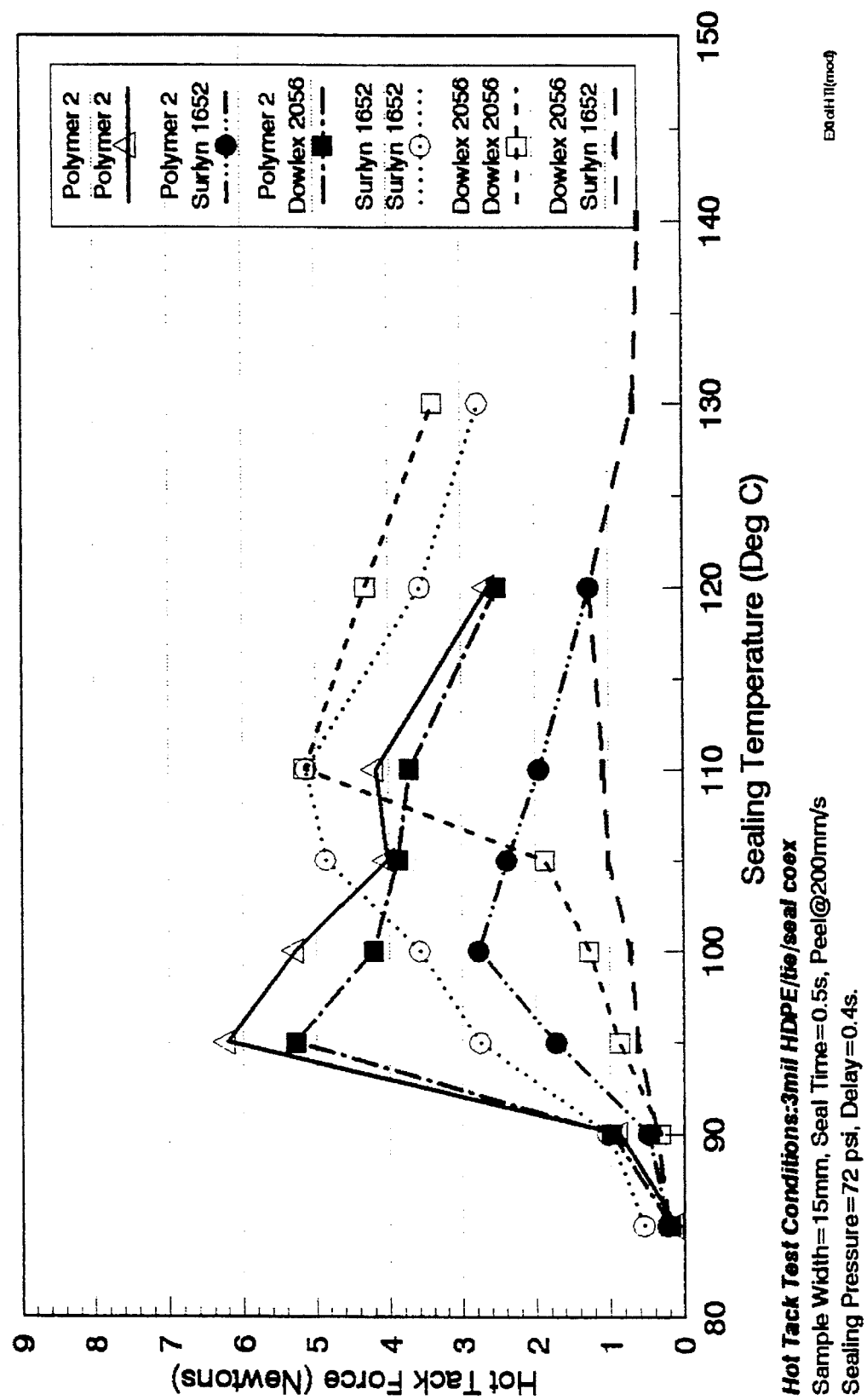
FIG. 5 is a graph of hot tack force as a function of sealing temperature illustrating the data in Table 5 for Polymer 2.
Figure 6:
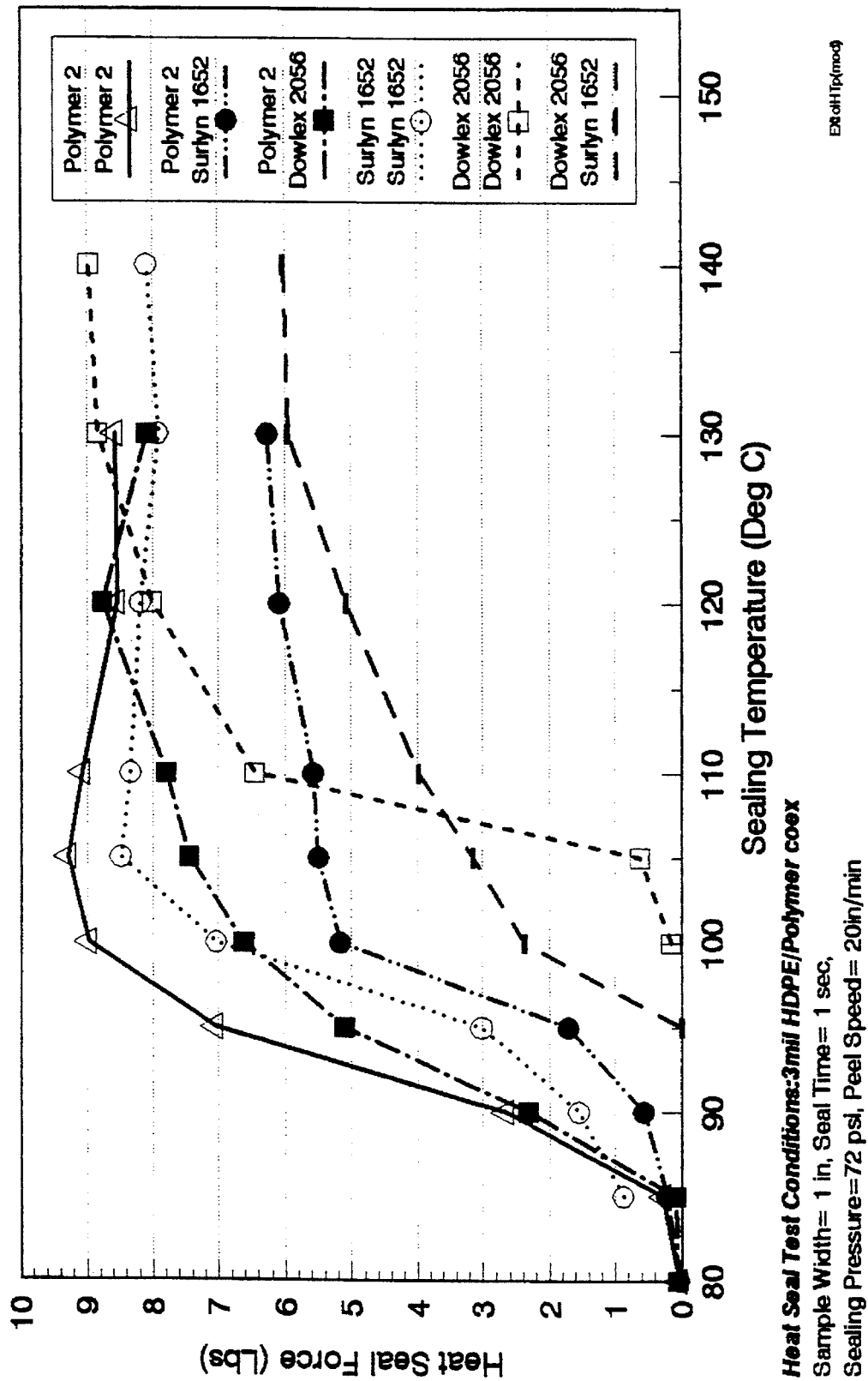
FIG. 6 is a graph of heat seal force as a function of sealing temperature illustrating the data from Table 6 for Polymer 2.

FIGS. 4, 6 and 8 show that similar heat seal performance is obtained when sealing Polymer 1, 2 or 3 to the ionomer. In all these cases the maximum seal strength is attained at much lower sealing temperatures than in the case of the conventional LLDPE-to-ionomer seals.

The films of the invention are useful as shrink films, cling film, stretch film, sealing films, oriented films, snack packaging, heavy duty bags, grocery sacks, baked and frozen food packaging, medical packaging, industrial liners, membranes, etc. in food-contact and non-food contact application. Fiber forming operations include melt spinning, solution spinning and melt blown fiber operations. Such fibers may be used in woven or non-woven form to make filters, diaper fabrics, medical garments, geotextiles, etc. General extruded articles include medical tubing, wire and cable coatings, geomembranes, and pond liners. Molded articles include single and multi-layered constructions in the form of bottles, tanks, large hollow articles, rigid food containers, toys and the like.

While the present invention has been described and illustrated by reference to particular embodiments thereof, it will be appreciated by those of ordinary skill in the art that the invention lends itself to variations not necessarily illustrated herein. For example, it is not beyond the scope of this invention to include additives with the claimed films or to blend or coextrude the claimed films with other polymers or even laminate the claimed films to other materials such as metal foils, paper, other polymer films and the like. For this reason, then, reference should be made solely to the appended claims for purposes of determining the true scope of the present invention.

TABLE 1

| Polymers | MI | Density (g/cc) | Comonomer | Extract | $M_w$ ($\times 10^{-3}$) | $M_z$ ($\times 10^{-3}$) | $M_{z+1}$ ($\times 10^{-3}$) | $M_z/M_w$ | $M_{z+1}/M_w$ | CDBI |
|---|---|---|---|---|---|---|---|---|---|---|
| Polymer 1 | 1.2 | 0.900 | C4 | 1.1 | 98.9 | 149.5 | 202.7 | 1.51 | 2.05 | 94 |
| Polymer 2 | 2.2 | 0.905 | C4 | 0.6 | 84.5 | 131.8 | 181.8 | 1.56 | 2.15 | 95 |
| Polymer 3 | 2.2 | 0.905 | C6 | — | 77.6 | 120.1 | 163.6 | 1.55 | 2.11 | 93 |
| Polymer 4 | 1.2 | 0.910 | C4/C6 | — | 95.6 | 156.5 | 235.1 | 1.64 | 2.46 | — |
| Polymer 5 | 1.2 | 0.900 | C4/C6 | — | — | — | — | — | — | — |
| Dowlex 2056 | 1.0 | 0.920 | C4/C8 | 0.8 | 119.7 | 378.4 | 800.5 | 3.16 | 6.69 | 56 |
| Surlyn 1652 | 5.5 | 0.940 | C2/MMA | — | — | — | — | — | — | — |

TABLE 2

| Polymer #1 Polymer #2 Temp (°C.) | Polymer 4 Polymer 4 | Polymer 4 Surlyn 1652 | Polymer 4 Dowlex 2056 | Surlyn 1652 Dowlex 2056 Hot Tack Force (Newtons) | Polymer 5 Polymer 5 | Surlyn 1652 Surlyn 1652 | Dowlex 2056 Dowlex 2056 |
|---|---|---|---|---|---|---|---|
| 85 | | 0.29 | | 0.22 | | 0.55 | |
| 90 | 0.55 | 0.48 | 0.38 | 0.37 | 0.45 | 1.03 | 0.32 |
| 95 | 1.74 | 0.87 | 1.42 | 0.62 | 1.91 | 2.76 | 0.87 |
| 100 | 6.75 | 1.65 | 6.81 | 0.72 | 6.85 | 3.59 | 1.28 |
| 105 | 7.01 | 4.26 | 7.14 | 1.01 | 6.95 | 4.86 | 1.87 |
| 110 | 7.1 | 5.38 | 7.05 | 1.08 | 7.17 | 5.09 | 5.14 |
| 120 | 6.43 | 2.52 | 7.02 | 1.26 | 6.41 | 3.57 | 4.31 |
| 130 | 6.18 | 1.94 | 6.32 | 0.67 | 6.02 | 2.77 | 3.39 |
| 140 | 2.97 | 1.9 | 3.49 | 0.59 | 3.48 | | |

Test Conditions:
Sample Width = 15 mm
Sealing Pressure = 72 psi
Sealing Time = 0.5 sec
Delay Time = 0.4 sec
Peel Speed = 200 mm/sec

TABLE 3

| Polymer #1<br>Polymer #2<br>Temp (°C.) | Polymer 4<br>Polymer 4 | Polymer 4<br>Surlyn 1652 | Polymer 4<br>Dowlex 2056 | Surlyn 1652<br>Dowlex 2056<br>Heat Seal<br>Force (lbs) | Polymer 5<br>Polymer 5 | Surlyn 1652<br>Surlyn 1652 | Dowlex 2056<br>Dowlex 2056 |
|---|---|---|---|---|---|---|---|
| 85  | 0.05 |      |      |      | 0.08 | 0.88 |      |
| 90  | 0.52 | 0.48 | 0.11 |      | 0.25 | 1.55 |      |
| 95  | 3.04 | 1.37 | 0.58 |      | 2.52 | 3.02 |      |
| 100 | 6.52 | 3.24 | 5.44 | 2.38 | 5.48 | 6.7  | 0.17 |
| 105 | 7.67 | 5.22 | 6.92 | 3.14 | 7.3  | 8.49 | 0.62 |
| 110 | 8.17 | 5.24 | 7.84 | 3.98 | 8.42 | 8.34 | 6.46 |
| 120 | 7.73 | 5.61 | 8.32 | 5.08 | 8.58 | 8.19 | 8.01 |
| 130 | 7.68 | 5.78 | 7.66 | 5.96 | 8.33 | 7.92 | 8.84 |
| 140 | 7.57 | 5.83 | 8.24 | 6.03 | 7.97 | 8.1  | 8.97 |

Test Conditions:
Sample Width = 1 inch
Sealing Pressure = 72 psi
Sealing Time = 1.0 sec
Peel Speed = 20 in/min

TABLE 4

| Polymer #1<br>Polymer #2<br>Temp (°C.) | Polymer 4<br>Polymer 4 | Polymer 4<br>Surlyn 1652 | Polymer 4<br>Dowlex 2056 | Surlyn 1652<br>Dowlex 2056 | Polymer 5<br>Polymer 5 | Surlyn 1652<br>Surlyn 1652 | Dowlex 2056<br>Dowlex 2056 |
|---|---|---|---|---|---|---|---|
| 85  | Peel      |      |      |      | Peel | Peel |      |
| 90  | Peel      | Peel | Peel |      | Peel | Peel |      |
| 95  | Peel      | Peel | Peel |      | Peel | Peel |      |
| 100 | Peel      | Peel | Peel | Peel | Peel | Tear | Peel |
| 105 | Peel-Tear | Peel | Peel | Peel | Peel | Tear | Peel |
| 110 | Peel-Tear | Peel | Tear | Peel | Tear | Tear | Peel |
| 120 | Peel-Tear | Peel | Tear | Peel | Tear | Tear | Peel |
| 130 | Peel-Tear | Peel | Tear | Peel | Tear | Tear | Tear |
| 140 | Peel-Tear | Peel | Tear | Peel | Tear | Tear | Tear |

Test Conditions:
Sample Width = 1 inch
Sealing Pressure = 72 psi
Sealing Time = 1.0 sec
Peel Speed = 20 in/min

TABLE 5

| Polymer #1<br>Polymer #2<br>Temp. (°C.) | Polymer 1<br>Polymer 1 | Polymer 1<br>Surlyn 1652 | Polymer 1<br>Dowlex 2056 | Polymer 2<br>Polymer 2<br>Hot Tack<br>Force<br>(Newtons) | Polymer 2<br>Surlyn 1652 | Polymer 2<br>Dowlex 2056 | Polymer 3<br>Polymer 3 | Polymer 3<br>Surlyn 1652 | Polymer 3<br>Dowlex 2036 |
|---|---|---|---|---|---|---|---|---|---|
| 80  | 0.2  | 0.17 | 0.17 |      | 0.13 |      |      | 0.16 |      |
| 85  | 1.01 | 0.3  | 0.69 | 0.12 | 0.23 | 0.19 | 0.4  | 0.25 | 0.27 |
| 90  | 8.21 | 1.03 | 3.21 | 0.87 | 0.48 | 0.98 | 1.34 | 0.58 | 1.3  |
| 95  | 6.4  | 3.25 | 6.09 | 6.21 | 1.73 | 5.28 | 6.96 | 1.63 | 7.33 |
| 100 | 5.71 | 4.76 | 4.63 | 5.27 | 2.78 | 4.21 | 7.64 | 5.89 | 8.21 |
| 105 | 5.57 | 3.26 | 5.3  | 4.02 | 2.39 | 3.88 | 6.61 | 4.96 | 7.45 |
| 110 | 5.28 | 2.33 | 5.4  | 4.17 | 1.95 | 3.72 | 7.08 | 4.66 | 7.87 |
| 120 | 3.18 | 2.06 | 2.88 | 2.64 | 1.27 | 2.51 | 5.58 | 2.41 | 5.17 |
| 130 | 2.55 | —    | —    | —    | —    | —    | 3.99 | —    | —    |

Test Conditions:
Sample Width = 15 mm
Sealing Pressure = 72 psi
Sealing Time = 0.5 sec
Delay Time = 0.4 sec
Peel Speed = 200 mm/sec

TABLE 6

| Polymer #1 | Polymer 1 | Polymer 1 | Polymer 1 | Polymer 2 | Polymer 2 | Polymer 2 | Polymer 3 | Polymer 3 | Polymer 3 |
|---|---|---|---|---|---|---|---|---|---|
| Polymer #2 | Polymer 1 | Surlyn 1652 | Dowlex 2056 | Polymer 2 | Surlyn 1652 | Dowlex 2056 | Polymer 3 | Surlyn 1652 | Dowlex 2036 |
| Temp (°C.) | | | | Hot Seal Force (lbs) | | | | | |
| 80 | 0.32 | 0.12 | 0.07 | 0.05 | 0.05 | 0.06 | 0.07 | 0.05 | 0.06 |
| 85 | 2.54 | 0.31 | 1.86 | 0.28 | 0.22 | 0.09 | 0.38 | 0.22 | 0.09 |
| 90 | 6.17 | 0.96 | 4.65 | 2.67 | 0.57 | 2.32 | 2.93 | 0.62 | 1.65 |
| 95 | 8.5 | 3.06 | 6.37 | 7.06 | 1.71 | 5.11 | 5.57 | 1.59 | 4.71 |
| 100 | 8.85 | 5.17 | 7.08 | 8.98 | 5.17 | 6.62 | 7.19 | 3.86 | 6.33 |
| 105 | 9.18 | 5.66 | 7.62 | 9.28 | 5.5 | 7.45 | 7.94 | 5.13 | 6.95 |
| 110 | 8.18 | 5.74 | 7.65 | 9.08 | 5.58 | 7.8 | 7.96 | 5.28 | 7.86 |
| 120 | 8.22 | 6.12 | 7.94 | 8.55 | 6.09 | 8.77 | 7.77 | 5.48 | 8.08 |
| 140 | 8.1 | 6.37 | 7.95 | 8.57 | 6.27 | 8.09 | 1.97 | 5.78 | 7.45 |

Test Conditions:
Sample Width = 1 inch
Sealing Pressure = 72 psi
Sealing Time = 1.0 sec
Peel Speed = 20 in/min

TABLE 7

| Polymer #1 | Polymer 1 | Polymer 1 | Polymer 1 | Polymer 2 | Polymer 2 | Polymer 2 | Polymer 3 | Polymer 3 | Polymer 3 |
|---|---|---|---|---|---|---|---|---|---|
| Polymer #2 | Polymer 1 | Surlyn 1652 | Dowlex 2056 | Polymer 2 | Surlyn 1652 | Dowlex 2056 | Polymer 3 | Surlyn 1652 | Dowlex 2036 |
| Temp (°C.) | | | | | | | | | |
| 80 | Peel | Peel | Peel | Peel | Peel | Peel | Peel | Peel | Peel |
| 85 | Peel | Peel | Peel | Peel | Peel | Peel | Peel | Peel | |
| 90 | Peel | Peel | Peel | Peel | Peel | Peel | Peel | Peel | |
| 95 | Peel–Tear | Peel | Peel | Peel | Peel | Peel | Peel | Peel | Peel |
| 100 | Tear | Peel | Peel | Tear | Peel | Peel | Peel | Peel | Peel |
| 105 | Tear | Peel | Peel | Tear | Peel | Peel | Tear | Peel | Peel–Tear |
| 110 | Peel–Tear | Peel | Tear | Peel–Tear | Peel | Peel–Tear | Tear | Peel | Tear |
| 120 | Peel–Tear | Peel | Tear | Peel–Tear | Peel | Tear | Tear | Peel | Tear |
| 140 | Peel–Tear | Peel | Tear | Peel–Tear | Peel | Tear | Tear | Peel | Tear |

Test Conditions:
Sample Width = 1 inch
Sealing Pressure = 72 psi
Sealing Time = 1.0 sec
Peel Speed = 20 in/min

We claim:

1. A heat sealed polymeric film comprising at least two layers, the first of said layers comprising a polymer, the polymer comprising at least one alpha-olefin monomer having from 2 to 20 carbon atoms, the polymer having a MWD less than 3.0, and a $M_z/M_w$ less than about 2.0; and a second of said layers comprising an ionomer; wherein said first and second layers are pressed together to form a seal, the seal having a peak hot tack force greater than about 2N at a sealing temperature in the range of about 80° C. to about 110° C.

2. The film of claim 1 wherein said polymer comprises at least one alphaolefin monomer having from 2 to 10 carbon atoms.

3. The film of claim 1 wherein said seal has a seal initiation temperature less than about 90° C.

4. A container comprising a polymeric film heat sealed to a film consisting essentially of an ionomer, said polymeric film comprising a polymer comprising at least two alpha-olefin monomers having from 2 to 20 carbon atoms, wherein one monomer is ethylene; the polymer having a MWD less than 3.0 and a CDBI greater than about 70%.

5. An article comprising a heat seal, said seal formed by pressing at least two portions of said article together at a temperature sufficient to soften at least one of the article portions, at least one of the portions comprising a polymeric layer formed from at least one polymer comprising at least two alpha-olefin monomers having from 2 to 20 carbon atoms, wherein one monomer is ethylene; the polymer having a $M_z/M_w$ of less than about 2.0 and a MWD less than 3.0; and another of said portions comprising at least one ionomer.

6. The article of claim 5 wherein said polymer has a CDBI greater than about 90%.

7. The article of claim 5 wherein said polymer is a copolymer comprising ethylene.

8. The article of claim 7 wherein said copolymer comprises ethylene and an alpha-olefin monomer having 3 to 20 carbon atoms.

9. The article of claim 5 wherein said polymer is a terpolymer comprising ethylene.

10. The article of claim 9 wherein said terpolymer comprises ethylene and at least two alpha-olefin monomers having 3 to 20 carbon atoms.

11. The article of claim 5 wherein said seal has a peak hot tack force greater than about 2N with a sealing temperature in the range of about 80° C. to about 110° C.

12. The article in accordance with claim 5 wherein said ionomer has a flex modulus in the range of from 2000 psi to about 80,000 psi.

13. An article of manufacture comprising a plurality of film layers, a first of said film layers comprising at least one polymer comprising at least one alpha-olefin monomer having 2 to 20 carbon atoms, the polymer produced by at least one metallocene catalyst; the first of said film layers is sealed to a second of said film layers, the second of said film layers comprising at least one ionomer; wherein said polymer of said first layer has a MWD less than 3.0 and a CDBI greater than about 70%, and said seal between said first and second film layers has a peak hot tack force greater than about 2N with a sealing temperature in the range of about 80° C. to about 100° C.

* * * * *